United States Patent
Lay et al.

(10) Patent No.: US 6,363,690 B1
(45) Date of Patent: Apr. 2, 2002

(54) AUTOMATIC MEASURING DEVICE AND METHOD FOR DISPENSING MATERIALS

(75) Inventors: Roger F. Lay, Woodbury; Joseph J. Cieplak, Hamden; Allen A. Crowe, Prospect, all of CT (US)

(73) Assignee: Ascom Hasler Mailing Systems, Inc., Shelton, CT (US)

( * ) Notice: Subject to any disclaimer, the term of this patent is extended or adjusted under 35 U.S.C. 154(b) by 0 days.

(21) Appl. No.: 09/419,045

(22) Filed: Oct. 15, 1999

Related U.S. Application Data

(60) Provisional application No. 60/116,275, filed on Jan. 19, 1999.

(51) Int. Cl.$^7$ .............................................. B65B 61/00
(52) U.S. Cl. ............................. 53/410; 53/66; 53/136.4; 53/416; 53/504
(58) Field of Search .............................. 53/66, 504, 76, 53/75, 416, 410, 136.4, 136.3, 136.1, 376.4, 377.2; 493/25, 22, 8, 117, 116

(56) References Cited

U.S. PATENT DOCUMENTS

| | | | |
|---|---|---|---|
| 3,045,402 A | * | 7/1962 | Keely et al. .................... 53/66 |
| 3,466,843 A | * | 9/1969 | Mumper .................... 53/66 X |
| 3,513,625 A | * | 5/1970 | Eller et al. ....................... 53/66 |
| 3,738,079 A | | 6/1973 | Rudman et al. ................. 53/66 |
| 4,233,797 A | | 11/1980 | Schwarz ......................... 53/66 |
| 4,501,106 A | | 2/1985 | Treiber et al. .................. 53/66 |
| 4,505,092 A | | 3/1985 | Bowers et al. ................. 53/504 |
| 4,583,345 A | | 4/1986 | Hirosaki et al. ................ 53/77 |
| 4,783,950 A | * | 11/1988 | Santagati .................... 53/76 X |
| 4,831,809 A | * | 5/1989 | Ballestrazzi et al. ......... 53/76 X |
| 5,299,410 A | | 4/1994 | Freeman ....................... 53/442 |
| 5,524,420 A | | 6/1996 | Ikuta ............................ 53/450 |
| 6,003,438 A | * | 12/1999 | Schwede ................... 53/66 X |

* cited by examiner

Primary Examiner—Eugene Kim
(74) Attorney, Agent, or Firm—Perman & Green, LLP

(57) ABSTRACT

In one preferred embodiment, an automatic measuring and material length control device, including: apparatus for measuring length of an article to which a material is to applied, the apparatus for measuring being able to measure the length without contacting the article; and apparatus for receiving from the apparatus for measuring a signal representative of the length and determining a length of the material to be dispensed and providing a control signal to a dispenser of the material to dispense the length of the material. In another preferred embodiment, a method of automatically measuring length of an article and controlling length of material to be applied to the article, comprising: measuring a length of the article to which the material is to applied, the measuring being done without contacting the article; receiving a signal representative of the length and determining a length of the material to be dispensed; and providing a control signal to a dispenser of the material to dispense the length of the material.

2 Claims, 2 Drawing Sheets

US 6,363,690 B1

AUTOMATIC MEASURING DEVICE AND METHOD FOR DISPENSING MATERIALS

CROSS-REFERENCE TO RELATED APPLICATION

The present application claims the benefit of the filing date of co-pending United States Provisional Patent Application Serial No. 60/116,275, filed Jan. 19, 1999, and titled DISPENSING MATERIALS.

BACKGROUND OF THE INVENTION

1. Field of the Invention

The present invention relates to dispensing materials generally and, more particularly, but not by way of limitation, to a novel device and method for automatically measuring the length of materials to be dispensed and applied to an article.

2. Background Art

While the present invention is described with reference to dispensing sealing tape for cartons, the present invention is applicable to the dispensing of materials generally, where the materials are supplied in roll or strip form, such as, but not limited to, sealing tape for closing cartons.

Dispensing, for the purpose of the present invention is defined as, but not limited to, feeding the material on command, cutting the material to a predetermined length, moistening if required to reactivate preapplied glue or adhesive, and presenting the material to the operator conveniently for subsequent uses. The material may include, but is not limited to, paper, plastic film, metal foil, fiberglass, cloth, nylon, rayon, or any combination of these and other flexible media. More particularly, but not by way of limitation, the present invention relates to improvements in the dispensing of such materials.

It is common to provide tape dispensers that feed and cut tape using electromechanical means and that determine the tape length being dispensed by means of electromechanical elements or by means of a code disk rotating at a circumferential speed related to the linear tape speed and generating pulses that are counted by discrete electronics or by a microprocessor. Further, it is common for the operator of a tape dispenser to estimate or manually measure the length of the box, carton, or package to be sealed and, if necessary, add the length of the required overlap of tape over the ends of the box, carton, or package. Such estimation and/or manual measurement is prone to error, wasted material, and is time consuming. It is common that increased cost is incurred, both in terms of labor and in terms of material cost for the excess or wasted tape.

Some known wrapping and packaging devices and methods are described in the following patents:

U.S. Pat. No. 3,738,079, issued Jun. 12, 1973, to Rudman et al., and titled BAG TYPE SHRINK WRAPPING APPARATUS, describes a machine which draws a shrink wrap tube downwardly over a loaded pallet. At a point, determined by an optical sensor which gauges the height of the load, the tubing is given a transverse seal and is cut.

U.S. Pat. No. 4,233,797, issued Nov. 18, 1980, to Schwarz, and titled AUTOMATIC BAGGING MACHINE, describes a machine similar in function to that of the '079 patent above, except that a garment is bagged in this patent. The length of the garment is sensed by an IR photodetector.

U.S. Pat. No. 4,501,106, issued Feb. 26, 1985, to Treiber et al., and titled WRAPPING CONTROL SYSTEM FOR FILM WRAPPING MACHINE, describes a film wrapping machine that employs swing arms and electrical switches to determine the height, length, and width of a package, selects one of at least two different widths of film, and cuts the length of the film accordingly.

U.S. Pat. No. 4,505,092, issued Mar. 19, 1985, to Bowers et al., and titled PACKAGE SENSING/FILM CONTROL SYSTEM FOR FILM WRAPPING MACHINE, is similar in pertinent respects to the '106 patent above.

U.S. Pat. No. 4,583,345, issued Apr. 22, 1986, to Hirosaki et al., and titled AUTOMATIC PACKAGING, MEASURING AND PRICING MACHINE, describes a system in which packaging film length is preset. After packaging, the article is weighed and a price label automatically printed and applied to the article.

U.S. Pat. No. 5,299,410, issued Apr. 5, 1994, to Freeman, and titled PACKAGING MECHANISM AND METHOD, describes a shrink wrapping machine which receives size information from a document feeder or from "sensing means (not shown)."

U.S. Pat. No. 5,524,420, issued Jun. 11, 1996, to Ikuta, and titled HORIZONTAL FORM-FILL-SEAL PACKAGING MACHINE AND METHOD OF CONTROLLING THE SAME, describes a machine for packaging articles in tubing, the cutting of the tubing between adjacent articles being controlled by the length of the articles. The length of the articles is determined by signals from an "article detection sensor."

None of the foregoing patents discloses an economical device and method for automatically measuring an article and dispensing material to be applied to the article.

Accordingly, it is a principal object of the present invention to provide a device and a method for automatically measuring an article and dispensing material to be applied to the article.

A further object of the invention is to provide such device and method that are economical.

An additional object of the invention is to provide such device and method that are accurate.

Another object of the invention is to provide such device and method that save time and material as compared with conventional devices and methods.

Yet a further object of the invention is to provide such device and method that are easily implemented and can be retrofitted to an existing packaging facility.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in one preferred embodiment, an automatic measuring and material length control device, comprising: means for measuring length of an article to which a material is to be applied, said means for measuring being able to measure said length without contacting said article; and means for receiving from said means for measuring a signal representative of said length and determining a length of said material to be dispensed and providing a control signal to a dispenser of said material to dispense said length of said material. In another preferred embodiment, a method of automatically measuring length of an article and controlling length of material to be applied to said article, comprising: measuring a length of said article to which said material is to be applied, said measuring being done without contacting said article; receiving a signal representative of said length and determining a length of said material to be dispensed; and providing a control signal to a dispenser of said material to dispense said length of said material.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
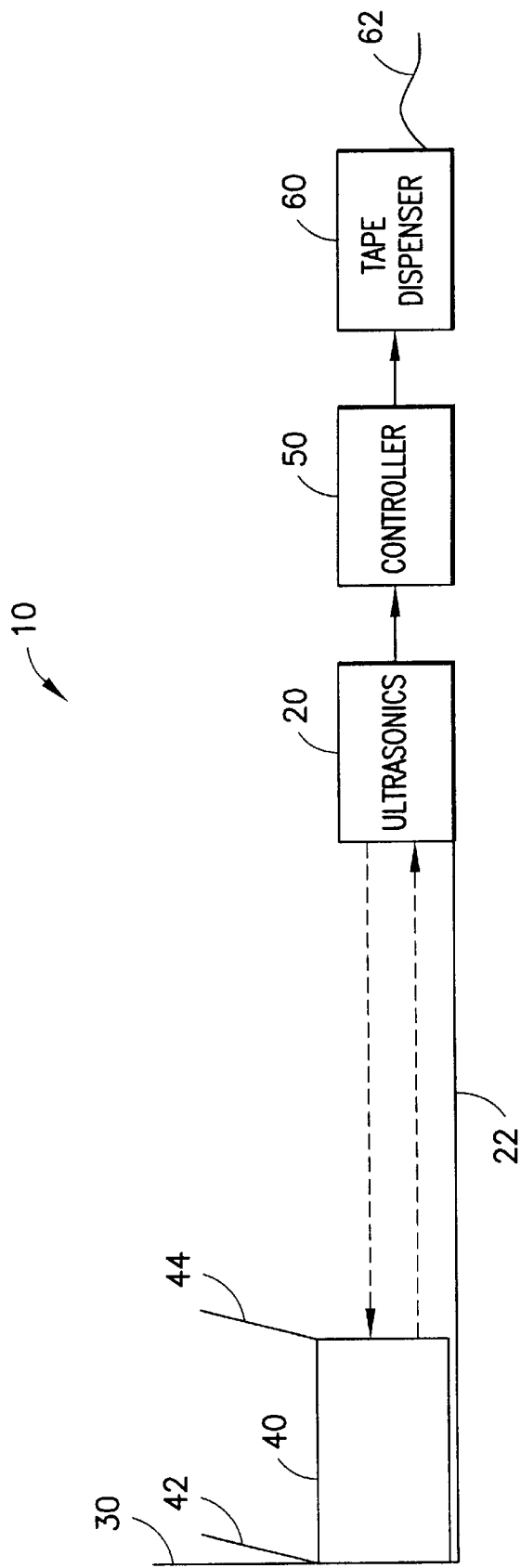
FIG. 1 is a schematic representation of the system of the present invention.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a carton sealing system, constructed according to the present invention, and generally indicated by the reference numeral 10.

System 10 includes an ultrasonic transducer 20 which may be placed on a surface 22, the surface being, for example only, a standalone bench provided for the purpose or a section of a new or existing conveyor in a packaging facility. A backstop, or calibration surface, 30 is provided at the end of or in connection with surface 22. Surface 22 is also provided such that a carton 40 with flaps 42 and 44, to be sealed in a conventional manner, may be placed thereon adjacent backstop 30. Ultrasonic transducer 20 is connected to provide an input to control circuitry 50 which is connected to provide an input to a tape dispenser 60 which dispenses lengths of tape, as at 62. Dispenser 60 may be of the type that moistens tape 62 as it exits the dispenser if the tape requires moistening to reactivate preapplied glue or adhesive.

Figure 2:
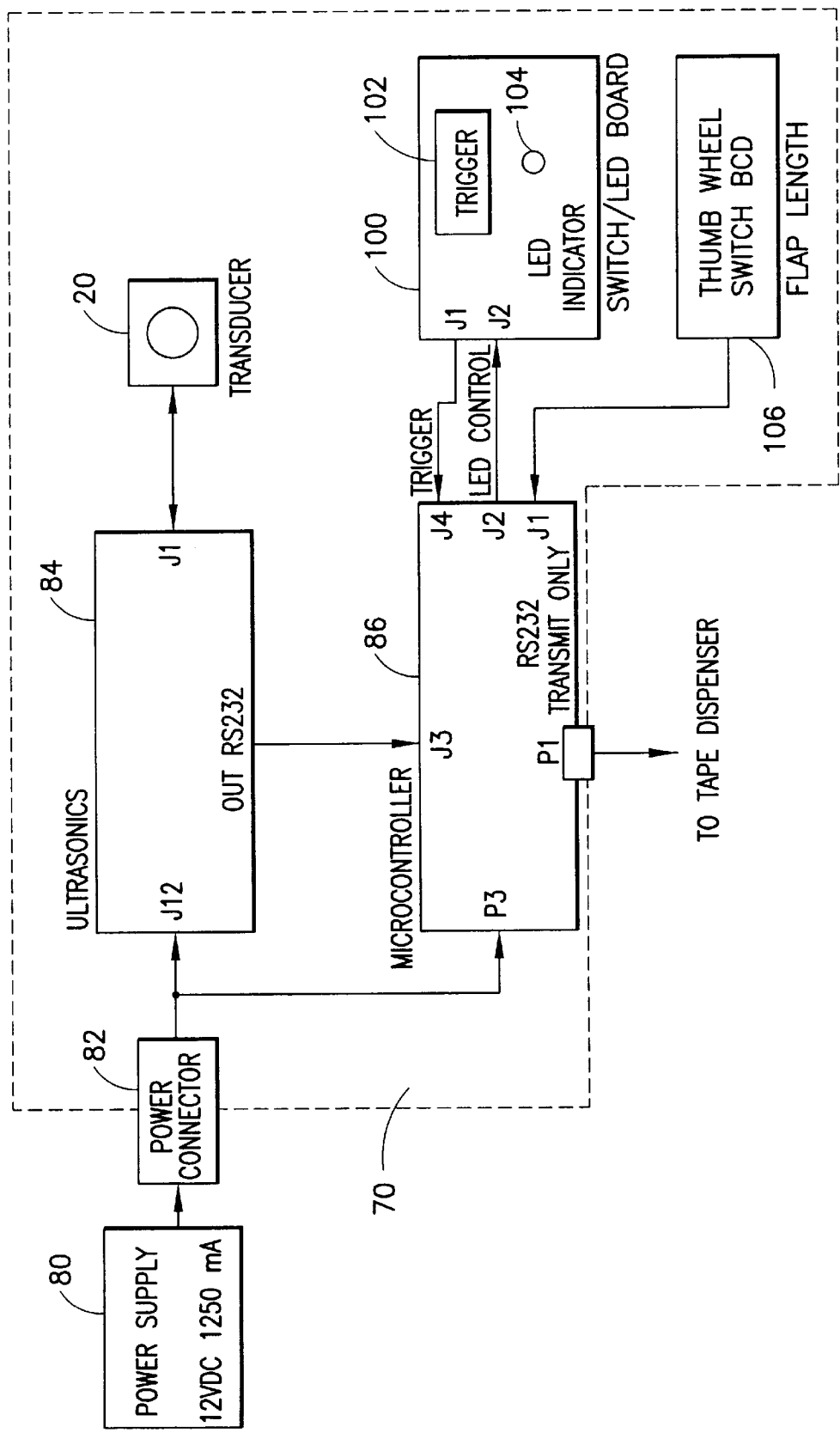
FIG. 2 is a block diagram showing the electronic/electromechanical elements of the control system of the present invention.

FIG. 2 illustrates the electronic circuitry of the present invention, generally indicated by the reference numeral 70. Electrical power from a power supply 80 is connected to electronic circuitry 70 through a power connector 82 and is distributed to ultrasonic transducer control circuitry 84 and to a microcontroller 86. Ultrasonic transducer control circuitry 84 is connected to ultrasonic transducer 20 (FIG. 1). Microcontroller 86 is connected to a switch/LED board 100 which includes a trigger switch 102 and an LED 104 and to a thumb wheel switch 106. Microcontroller 86 provides an input to tape dispenser 60 (FIG. 1).

In use, an operator (not shown) makes sure that there is nothing between ultrasonic transducer 20 (FIG. 1) and backstop 30 and activates system 10 (FIG. 1). LED 104 (FIG. 2) now alternatingly flashes red and green and microcontroller 86 ascertains that tape dispenser 60 (FIG. 1) is operational. Next, the operator presses trigger switch 102 (FIG. 2). Thereupon, ultrasonic transducer 20 (FIG. 1) and ultrasonic control circuitry (FIG. 2) measure the distance to backstop 30 and that distance is stored in microcontroller 86 (FIG. 2) as a calibration distance and LED 104 becomes solid green. If power is subsequently lost and regained, LED 104 will again alternatingly flash red and green until trigger switch 102 is pressed.

Now, the operator uses thumb wheel switch 106 (FIG. 2) to dial in the length of tape to be placed over an end of carton 40 (FIG. 1), also known as the "flap length". This information is received by microcontroller 86 which doubles the length to account for both ends of tape 62. The operator then positions carton 40 on surface 22 adjacent backstop 30 and again presses trigger switch 102 (FIG. 2). Ultrasonic transducer 20 (FIG. 1) and ultrasonic control circuitry 84 (FIG. 2) then measure the distance to the near side of box 40 and the ultrasonic control circuitry transmits this information to microcontroller 86 (FIG. 2) which makes the necessary length calculation and signals tape dispenser 60 to dispense that length of tape 62. The length calculation includes adjustment to take into account mechanical limitations of tape dispenser 60, this adjustment being the same adjustment the tape dispenser firmware makes when a length is entered via the dispenser keypad.

If it is desired to provide lengths of tape for the width of carton 40; that is, if lengths of tape are to be placed in an "H" pattern on the carton, the carton may be rotated 90 degrees and the above procedure followed twice. Alternatively, a second measuring system, similar to system 10, may be provided orthogonal to system 10, to measure and dispense tape for the width of carton 40.

In summary, the invention provides a microprocessor controlled tape dispenser attached via a communications port to an automatic measuring and control device. With a single push of a button, the measurement system measures the length of a box, adds in a selectable flap length, and commands the tape dispenser to dispense the determined length of tape. This represents savings in time and sealing tape material and ensures uniform sealing of cartons for improved appearance and enhanced security.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction and/or method without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

We claim:

1. An automatic carton length measuring and sealing tape dispensing device, comprising:

a length detector including an ultrasonic length measurement system for measuring a length of a carton to which sealing tape is to be applied from the sealing type dispensing device having the proper length to apply to the carton for sealing attachment thereto, the length detector being able to measure the length without contacting the carton by sensing a first distance to a calibration surface and a second distance to a near surface of the carton when the carton abuts the calibration surface and operable to generate signals representative, respectively, of the first and second distances; and a controller connected to receive from the length detector the signals representative of the first distance to the calibration surface and of the second distance to the near surface of the carton and responsive to the first and second distances to determine the length of the sealing tape to be dispensed and to thereby provide a control signal output; and a sealing tape dispenser connected to receive the control signal output to dispense the length of sealing tape in response thereto.

2. A method of automatically measuring length of a carton and controlling length of sealing tape to be applied to the carton, comprising the steps of:

(a) using an ultrasonic length measurement system, measuring a length of the carton to which the sealing tape is to be applied from a sealing tape dispensing device, the measuring being done without contacting the carton by sensing a first distance to a calibration surface and a second distance to a near surface of the carton when the carton abuts the calibration surface and generating signals representative, respectively, of the first and second distances;

(b) receiving the signals representative of the first distance to the calibration surface and of the second distance to the near surface of the carton from step (a) and determining a length of the sealing tape to be dispensed; and (c) in response to the first and second signals, providing a control signal to a sealing tape dispenser to dispense the length of the sealing tape.

* * * * *